Nov. 4, 1941.         W. C. SCHEU         2,261,454
TREE PROTECTOR
Filed July 9, 1940

Inventor
WILLIAM C. SCHEU,
By Alfred W. Knight
Attorney

Patented Nov. 4, 1941

2,261,454

UNITED STATES PATENT OFFICE 2,261,454

TREE PROTECTOR

William C. Scheu, Upland, Calif.

Application July 9, 1940, Serial No. 344,543

5 Claims. (Cl. 43—108)

The present invention relates to devices for protecting trees and the like from pests that travel along the tree trunk and eat the foliage or the fruit; and the invention relates more especially to a ring-like pan device adapted to encircle the tree trunk for this purpose. While the pan may protect the tree to a greater or lesser extent by merely acting as a barrier to climbing pests, it is contemplated that the pan will be used to hold poisoned meal or bait across which the pests must pass and, in so doing, become poisoned.

Various devices of this character have been used in the past, but they have possessed various disadvantages. Some have been rigid and not adjustable to trees of different size or shape. Others, while adjustable to some extent, fit only circular tree trunks and are not conformable to trunks of non-circular outline. Another objection of prime importance is that the cost of manufacture of prior devices has been relatively high in most instances, thus making the cost to the consumer prohibitive when purchased in the large quantities necessary for orchards.

It is thus a general object of my invention to provide a pan of the character described that is adjustable to trees of different diameter or size, and conforms to the shape of non-circular tree trunks. Thus the pan can not only be attached easily to trees of various sizes, but it can fit snugly around the trunk and prevent pests from climbing up the trunk through a space between the trunk and the pan.

Another object is to provide such a pan that is adjustable by both large and small increments in order that it may be quickly and easily adjusted to the tree with the closest possible fit, and with the greatest economy of material.

A further object is to provide such a pan that can be manufactured relatively cheaply, using inexpensive material and inexpensive dies and the like.

These advantages are attained according to my invention by providing a pan of the character described that comprises a relatively large number of segments connected together to form a ring-like figure with a central opening that encircles the tree trunk. The size of the central opening can be adjusted to trunks of different sizes by changing the number of segments used, or by relative adjustment of adjacent segments with respect to each other at their positions of interconnection.

In a preferred form, the segments are pivotally connected together to permit relative movement of adjoining segments, thus allowing the pan to conform to the shape of non-circular tree trunks. It is also preferred that at least a part of the segments be slidably connected together in order to permit small changes in the size and shape of the central opening of the pan.

How the above, as well as other objects and advantages not specifically mentioned, are attained will be more readily understood by reference to the following description and the annexed drawing, in which.

Figure 1:
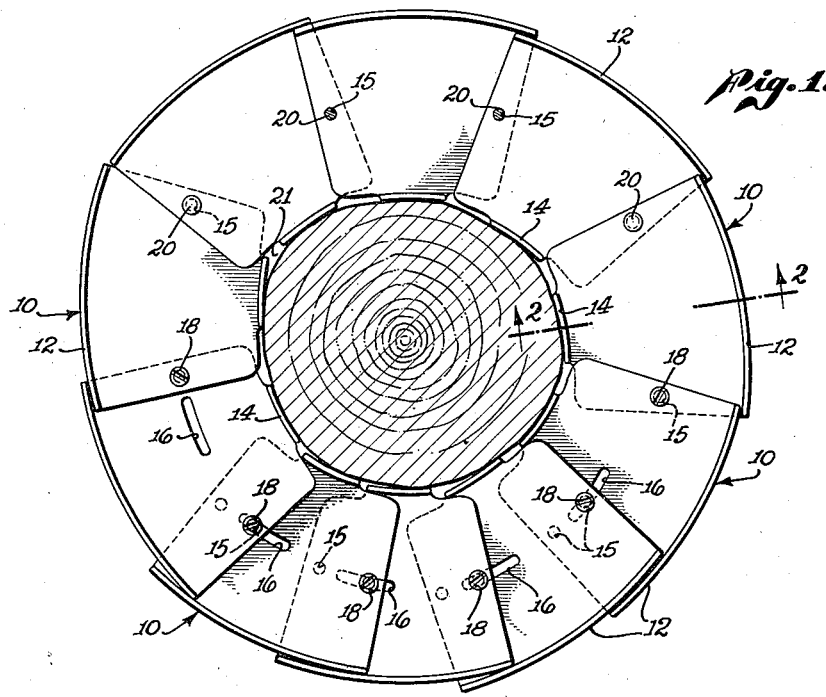
Fig. 1 is a plan view of a preferred form of my improved tree-protector pan, showing the protector encircling a tree trunk.

Fig. 1 shows in plan view a preferred form of tree protector manufactured according to my invention, and comprising a plurality of individual segments 10. Each of these segments 10 is made of sheet metal of suitable thickness, although other materials could be used in place of sheet metal. Each segment 10 has arcuate inner and outer edges and straight side edges, and is preferably flat, as shown. At the outer edge is an up-turned flange 12 which follows the arcuate outer edge and extends substantially across the segment from one side edge to the other. At the inner arcuate edge is an up-turned flange 14 which is preferably considerably shorter than the distance between the side edges and is located substantially centrally of the inner edge of the segment. The purpose of flange 14 is to prevent the sharp edge of the sheet metal from cutting into the bark of the tree and consequently flange 14 need be of but comparatively small height; while flange 12 is considerably higher as its purpose is to retain on the pan a bed of material laid on the upper surface thereof. These flanges also serve to stiffen the segments and prevent undesired deformation thereof.

The inner and outer edges are preferably circular arcs, as this configuration better adapts the pan to its purpose, but it will be understood that the invention is not necessarily limited thereto in its broader aspects. Likewise, the straight side edges are preferably inwardly converging, but this is not essential since the side edges could also be parallel.

Near each side edge and approximately midway between the arcuate inner and outer edges, each segment is provided with an aperture 15 through which suitable connection means may be passed to connect adjoining segments together. Likewise, some of the segments, though not necessarily all of them, are preferably provided with elongated apertures, such as arcuate slots 16, which also may be used to connect the segments together.

As will be noted from Fig. 1, adjoining segments 10 are placed in overlapping relation with their fastening apertures in registry, and then suitable connecting means are passed through the two apertures, thus pivotally connecting together two adjoining segments. The connecting means may be ordinary bolts with nuts on them, as indicated at 18, or part of the bolts may be replaced by rivets, as indicated at 20. The reason for this construction will be brought out later; but it will be obvious that any other suitable type of connecting means may also be used.

A plurality of segments thus connected together form a ring-like figure with a central opening 21 that may be adjusted to the size and shape of the tree trunk which the pan encircles. In general, the size or diameter of the central opening is determined by the number of segments 10 connected together to form the pan, assuming segments of a uniform given size. Of course, where tree trunks of relatively large diameters are to be encircled, larger segments may be used than where the tree trunks are all of a relatively smaller size. However, for the ordinary trees encountered in fruit orchards the segments are preferably of such a size that a majority of the pans will contain from six to ten segments, as this number secures the advantages of my invention; however, it is to be understood that my invention is in no way limited to any particular number of segments in a pan.

As mentioned above, the large changes in the size of the central opening of the ring-like pan may be obtained by changing the number of segments in the pan. However, in addition thereto, smaller changes in size of the central opening may be obtained by passing the connecting means through slots 16, as shown in the case of bolts 18. By thus slidably connecting together adjoining segments 10, the location of the point of connection on the segment can be changed and the effective size of the segments may be varied by increasing or decreasing the amount of overlap. This construction permits the pan to be quickly adjusted to a very close fit to the tree trunk.

It has been found in experience that tree trunks are rarely exactly circular in cross-section, and that many trunks depart substantially from this ideal shape. My improved tree-protecting pan is easily adjusted to conform to non-circular tree trunks as the adjoining segments 10 are pivotally connected together, thus permitting the central opening to assume any shape necessary to make it conform to a non-circular tree trunk. Adjustment to irregular shapes of tree trunks is further facilitated by the use of slots 16 to receive the connecting means, as this arrangement permits relative sliding movement of adjoining segments to permit the pan to conform to the tree trunk.

While it is entirely practical to use bolts 18 as a connecting means throughout the entire pan, it is preferred that at least a portion of the segments be connected together by rivets 20, the number of segments so connected being determined in practice by the size of the smallest tree which it is expected to encircle. This riveting together of the segments may be done in the shop at very little expense. The remaining connecting means are bolts 18 which may pass either through slots 16 or holes 15 as desired, according to the size and shape of the individual tree. And it is preferred that at least a portion of these connecting means be bolts or other clamping devices of an easily removable nature so that the location of the connecting means may be changed in the field from a hole 15 to a slot 16 or vice versa, as may be required by field conditions.

Those segments 10 which are riveted together are preferably not provided with slots 16, but the individual segments 10 which are added to the basic number of segments which are pre-riveted are provided with slots 16 in order that the amount of overlap between adjoining segments may be adjusted as may be necessary to adjust the central opening of the ring-like pan to the particular tree being fitted. Of course, for simplicity of manufacture, slots 16 may be placed in all segments. Furthermore, bolts 18 or other connecting means that clamp the overlapping segments to hold them in any desired position of adjustment are preferably provided at each position in which a slot 16 is used.

Figure 3:
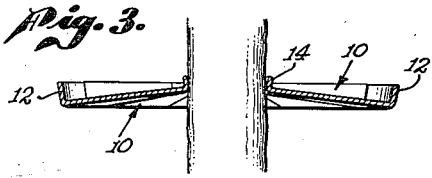
Fig. 3 is a vertical section through a pan, showing it in position on a tree trunk.
Figure 2:
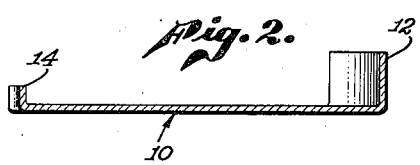
Fig. 2 is a vertical section through a single segment on line 2—2 of Fig. 1.

In position on the tree, the pan appears as shown in Fig. 3. Flanges 14 bear against the tree trunk and prevent sharp edges of its metal from scarring the bark. The weight of the pan and the contents ordinarily causes it to slope downwardly and outwardly into a flat cone. Flange 12 provides a railing to hold on the pan poisoned bait or meal or other substances used to catch or poison climbing pests which of necessity must pass over the top surface of the pan if they are to continue along the tree trunk.

Figure 4:
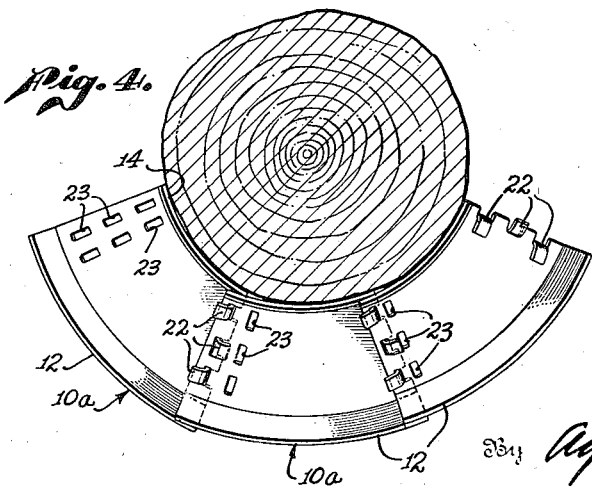
Fig. 4 is a fragmentary plan view of a modified form of my invention.

Fig. 4 shows in fragmentary plan a variational form of pan composed of a plurality of segments 10a which are generally similar to those already described, but a different type of connecting means is used to connect together adjoining segments. The segments 10a are, like segments 10, provided with up-turned flanges 12 and 14 at the outer and inner arcuate edges respectively. However, the connecting means used on this type of pan comprises a plurality of tabs 22 cut from the segment along one of the side edges, and a plurality of apertures 23 cut along the other side edge. As may be seen from Fig. 4, tabs 22 on one segment are inserted in apertures 23 of the adjoining segment and the tabs are then bent over to hold the segments together. Although all the tabs may be bent in one direction, it has been found that a stiffer connection is provided by bending the top and bottom tabs 22 through 180 degrees while the center tab 22 extends forward over the adjoining segment in the opposite direction.

Since flange 14 extends the full width of segment 10a, the segment has a lesser radial dimension at one side than at the other in order for both flanges of the upper segment to lie between the flanges of the lower segment in the region of overlap. Though preferably flat, segments 10a may be slightly curved transversely.

As before, a plurality of segments 10a are suitably connected together to form a ring-like figure which encircles the tree trunk, the central opening of the figure being adjusted to the size of the trunk by the number of segments. In general characteristics, this form of the invention is the same as that previously described, except that the adjoining segments are connected together in a different manner and are more limited in their pivotal or sliding movement with respect to one another.

It is preferred that at least some of segments 10a have two or more rows of apertures 23 in order to permit changing the location of the fastening means on the segment. By this construction small changes in the size of the central opening that receives the tree trunk may be made, in addition to the relatively large changes in the size of the opening obtained by the addition or subtraction of an entire segment. The added rows of apertures 23 correspond in function to slots 16 as a means for securing relative sliding movement and changing the amount of overlap between two adjoining segments to effect adjustment of the size of the central opening of the ring-like pan.

When in place around a tree, the angle between the tree trunk and the under side of the pan increases as the central opening increases in diameter to accommodate a larger tree until, when the maximum diameter for the particular pan is reached, the pan is relatively flat as shown in Fig. 3.

Figure 5:
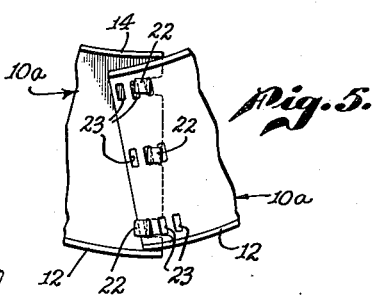
Fig. 5 is a fragmentary plan view of two segments of the type shown in Fig. 4, illustrating how they may be moved relative to each other.

Fig. 5 illustrates an arrangement of apertures 23 that permits limited pivotal movement of two adjoining segments 10a about the center tab 22. One segment is provided with three equally spaced, radial rows of apertures 23 with the openings in all rows equally spaced. All tabs may be placed in the same row of apertures as in Fig. 4; or each tab may be placed in a different row of apertures. With the outer, center and inner tabs in the first, second, and third rows of aperture, as in Fig. 5, one segment, in effect, pivots about the center tab 22. And a third position is possible with the inner and outer tabs in the first and third rows of apertures, creating relative pivotal movement in the reverse direction.

The segmental construction affords marked advantages in economy of manufacture as the individual segments may be stamped out of sheet metal very cheaply and easily with maximum economy of material. Any desired number may then be connected together to fit a tree.

Having described two different embodiments of my invention, it will be understood that my improved ring-like pan for protecting trees may be altered in various ways by changing the arrangement and location of the parts without departing from the spirit and scope of my invention; and consequently, it is to be understood that the foregoing description is to be construed as illustrative of, rather than limitative upon, the invention as defined in the appended claims.

I claim:

1. A device adapted to encircle a tree trunk to protect the tree against climbing pests, comprising a plurality of individual segments; and means connecting the segments together to form a ring-like figure with a central opening substantially the size of the tree trunk, the size of the central opening being determined by the number of segments.

2. A device adapted to encircle a tree trunk to protect the tree against climbing pests, comprising a plurality of individual segments; and means connecting the segments together at selected points to form a ring-like figure with a central opening substantially the size of the tree trunk, the size of the central opening being determined by the number of segments and by the locations of the points of connection of the segments.

3. A device adapted to encircle a tree trunk to protect the tree against climbing pests, comprising a plurality of individual segments; and means pivotally connecting together adjoining segments to form a ring-like figure with a central opening substantially conformable to the size and shape of the tree trunk, the size of the central opening being determined by the number of segments.

4. A device adapted to encircle a tree trunk to protect the tree against climbing pests, comprising a plurality of individual segments; and means pivotally and slidably connecting together adjoining segments to form a ring-like figure with a central opening substantially conformable to the size and shape of the tree trunk, the size of the central opening being determined by the number of segments and the shape of the opening being adjustable by relative pivotal movement of the segments.

5. A device adapted to encircle a tree trunk to protect the tree against climbing pests, comprising a plurality of individual segments, each segment having means formed integrally therewith along one side edge for rigidly connecting the segment to an adjoining segment, a plurality of connected segments forming a ring-like figure with a central opening the size of which is determined by the number of segments in order to fit the tree trunk.

WILLIAM C. SCHEU.